Patented June 5, 1928.

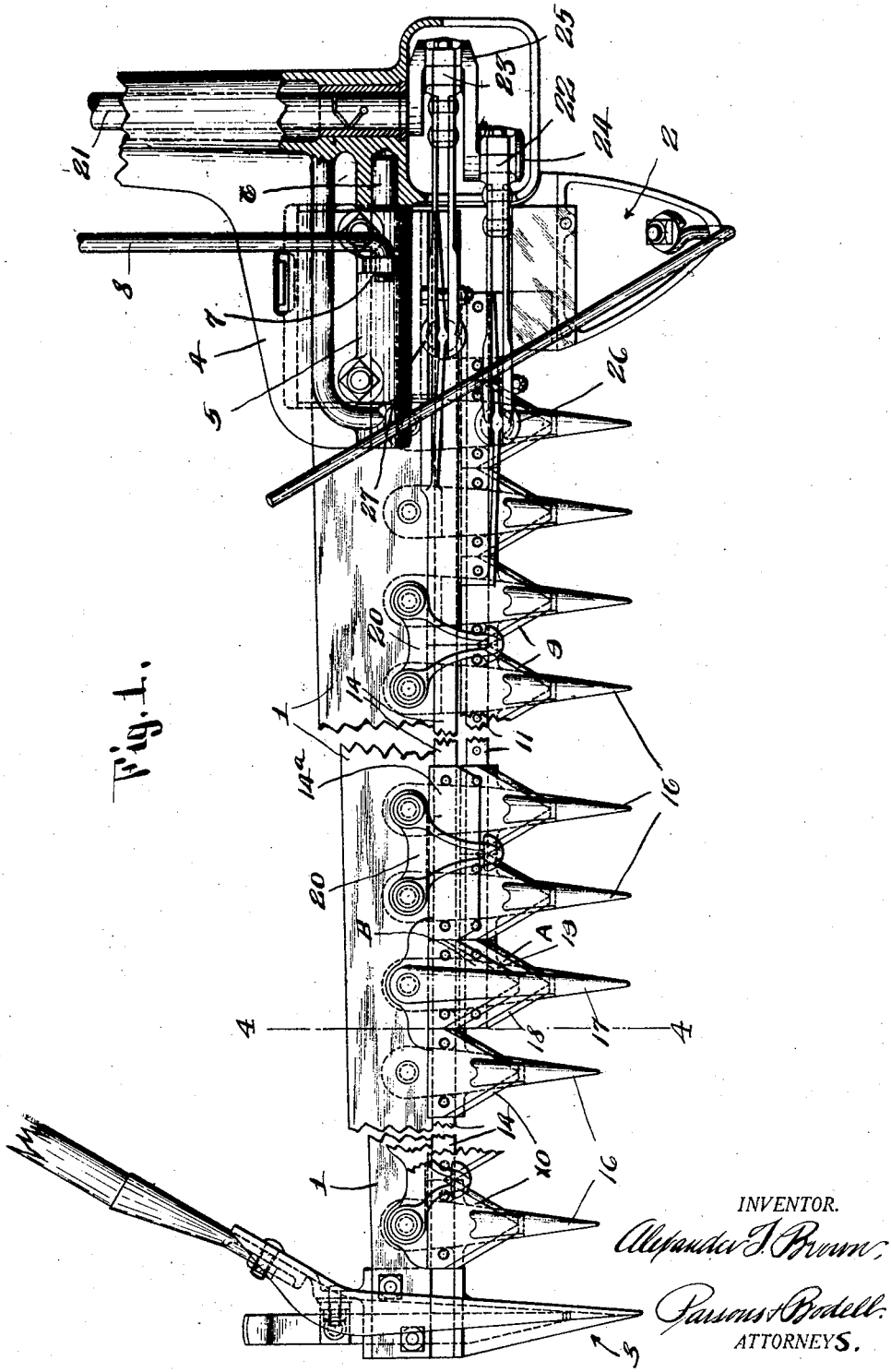

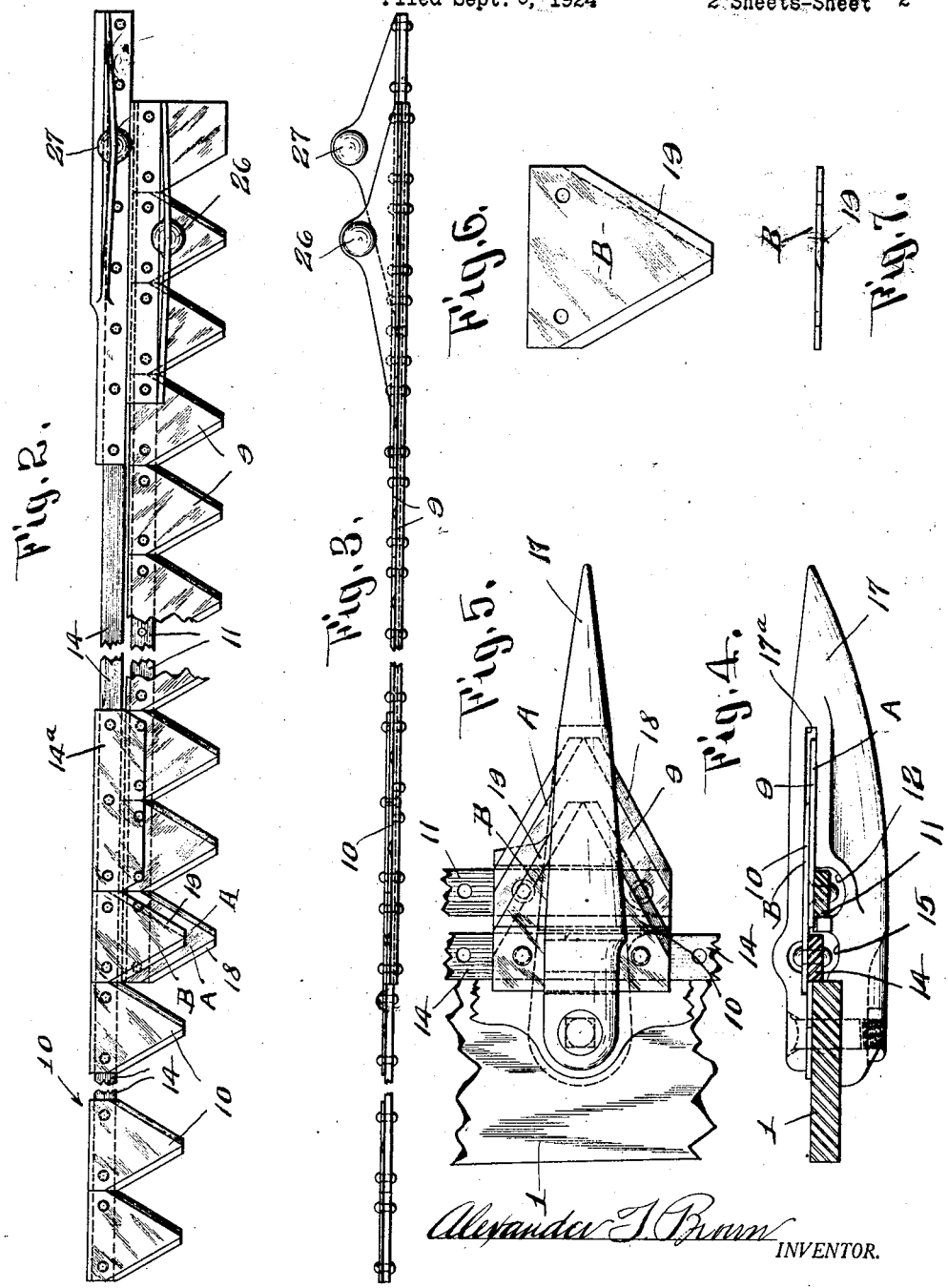

1,672,363

UNITED STATES PATENT OFFICE.

ALEXANDER T. BROWN, OF SYRACUSE, NEW YORK.

MOWER-BAR CONSTRUCTION.

Application filed September 8, 1924. Serial No. 736,529.

This invention relates to mowing machines and has for its object a mower or cutter bar construction, in which excessive vibration is eliminated or greatly reduced, compared with old forms of mower knives, so that, the mowing machine can be drawn or propelled and the knives reciprocated at a faster rate.

The invention consists in the novel features and in the combinations and constructions hereinafter set forth and claimed.

In describing this invention reference is had to the accompanying drawings in which like characters designate corresponding parts in all the views.

Figure 1 is a plan view partly broken away, of a mower bar and contiguous parts embodying my invention.

Figure 2 is a detail plan view of the detached knives showing the relation thereof.

Figure 3 is an edge view looking upward in Fig. 2.

Figure 4 is a sectional view on the plane of line 4—4, Fig. 1.

Figure 5 is a plan view of parts seen in Fig. 4.

Figures 6 and 7 are respectively a plan view and edge view of the inner end blade of the outer knife.

This mower bar construction comprises generally, a supporting bar, a pair of reciprocating knives movable along the bar oppositely relatively to each other, the blades of one knife extending part way along the supporting bar, and the blades of the other knife extending along another portion or the remaining length of the bar, substantially in continuation of the blades of the former bar, with the exception that they move oppositely to the former knife, and means for reciprocating the knives.

In my pending application Serial No. 725,192, filed July 10, 1924, I have illustrated a mower bar having reciprocating knives, movable oppositely to each other, but with one knife above the other.

In my present invention the knives do not move one above the other, but one knife is practically an extension of the other, with the exception that one knife moves opposite to the other knife, so that, the vibrations of the knives are practically neutralized.

1 designates the mower bar, having the usual shoe 2, at its inner end, and a shoe 3 at its outer end, the shoe 2 being mounted in any suitable manner on a bracket 4 forming part of a carrier suitably supported by the main frame of the mower to move or to be moved up and down for the purpose of causing the mower bar to float over the ground and conform to the surface of the ground, or to be raised when not in use. The mower bar 1 and shoe 2 are also carried in any suitable manner to be tilted about a horizontal axis extending lengthwise of the bar, the shoe 2 being here shown as having a bearing 5 on a spindle 6 carried by the bracket 4, the shoe 2 having an upwardly extending arm 7 to which one end of a link 8 is connected. The other end of the link 8 as will be understood, is connected to a suitable control lever in any well known manner, carried by the main frame of the mower within the reach of the operator. The carrier for the mower bar is also provided with means for raising and lowering it in any well known manner. The construction thus far described forms no part of this invention.

This invention lies principally in the arrangement of the oppositely movable knives. 9 and 10 designate the knives movable along the bar 1, the knife 9 having its knife back 11 slidable in a suitable guide as a groove 12, formed in the bar or part fixed to the bar as the guards to be presently described, and this knife 9 having its blades extending but part way as about half way along the bar 1 from the inner end of the bar, and the knife 10 having its knife back 14 movable in a guide or groove 15 extending parallel to the groove 12, the knife back 14 extending practically the entire length of the bar 1, but the outer end portion thereof only being provided with blades, and the inner end portion being unprovided with blades and extending in the rear of the knife 9. Preferably a shield or plate 14ª is mounted upon the back of the knife 10 overlying the outer end of the knife 9 forming a sort of sliding lap joint between the knives. This shield also prevents dirt, grass, and obstructions generally, from interfering with the operation of the knives where the blades lap.

16 are the guards in the form of fingers, secured to the bar 1 and extending forwardly therefrom, these guards being of any well known construction. The blades shear the crop against the guards in the usual manner.

Also the adjacent blades of the knives 9 and 10 lap each other and come into and out of alinement during the reciprocating of the knives, and also into and out of alinement with the guard 17. The cutting edge as 18 of one of these blades designated A which coacts with the guard 17 being beveled downwardly in the usual manner to coact with a shearing edge on the guard 17, or a ledger plate on the guard if ledger plates are used; and the cutting edge 19 of the end blade designated B, of the knife 10 which coacts with the guard 17 is beveled upwardly, so that, its cutting edge is out of the plane of the cutting edge 18. The guards are of any well known construction and each is formed with the usual slot like passage as 17ª through which the blades move. The cutting edge 18 of the blade A coacts with the edge of the guard 17 at the lower inner corner of the slot, that is, the corner toward the shoe 2, and the cutting edge 19 of the blade B coacts with the edge of the guard 17 at the obliquely opposite corner of the slot 17ª, that is the upper outer corner toward the shoe 3. That is, only one edge of the blade B coacts with the guard or finger 17 and this edge 19 is sharpened or beveled oppositely to the sharpening or beveling of the other edge and of the edges of the other blades, this edge 19 being sharpened or beveled to coact with the upper side of the slot 17ª of the guard 17 to shear or cut the grass or other crop, while the other edge of this blade B as well as both edges of all the other blades are sharpened to coact with the lower sides of the slots in the other fingers or guards 17, Blade A is sharpened in the usual manner to coact with the lower side of the slot 17ª of guard 17. Suitable clips 20 are provided at intervals on the bar, and these clips 20 overhang the upper faces of the knives and act to hold the knives from displacement upwardly out of the plane of movement of the knives.

This means for reciprocating the knives oppositely to each other, comprises a double throw eccentric or crank mounted upon a suitable crank shaft 21 carried by a bracket 4, and pitmen 22, 23, connecting the cranks 24, 25, to like ends of the knives. The pitmen 22, 23, are connected to the cranks or to the knives or to both by universal joints, these joints permitting the tilting action of the knives, as will be understood by those skilled in the art. As here illustrated the pitmen are connected to the knife backs 9, 10, by ball and socket joints 26, 27. The crank shaft is actuated in any well known manner either by a motor mounted on the mower frame to drive the mower, or from a driving ground wheel or in any other well known manner.

Owing to the relative arangement of the reciprocating knives and the actuation of said knives oppositely to each other, the vibration of the knives is neutralized, and hence, the knives can be actuated much faster than the mower knives heretofore used, it being understood that mower knives heretofore used must be reciprocated at comparatively slow speed due to the excess vibrations, whipping, and strains set up. By my arrangement of the mower knives the excessive vibrations, whippings and strains are eliminated. The lighter reciprocating weight and shorter cutting length of each knife reduces the stresses in the knife backs, and pressure on pitman bearings, thus reducing the common breakage of knife backs, and bearing wear which occurs in long cutter bars heretofore commonly used.

What I claim is:—

In a mower bar construction, the combination of a supporting bar, a pair of reciprocating knives movable oppositely relatively to each other along the bar, and having forwardly extending blades, guards extending forwardly from the bar in front of the knife blades, the blades of one knife extending part way along the bar, and the blades of the other knife extending along the remaining length of the bar, the adjacent end blades of the knife being arranged to come into and out of alinement, one over the other during the reciprocation of the knives, and in alinement with one of the guards, the blades coacting with the guards to shear the crop, and the cutting edge of the end blade of one knife coacting with one of the guards being beveled downwardly to coact with said guard, and one of the cutting edges of the blade of the other knife coacting with said guard being beveled upwardly, and means for reciprocating the knives oppositely to each other substantially as and for the purpose described.

In testimony whereof, I have hereunto signed my name, at Syracuse, in the county of Onondaga, and State of New York, this 5th day of September, 1924.

ALEXANDER T. BROWN.